(12) United States Patent
Banning et al.

(10) Patent No.: US 7,206,845 B2
(45) Date of Patent: Apr. 17, 2007

(54) METHOD, SYSTEM AND PROGRAM PRODUCT FOR MONITORING AND CONTROLLING ACCESS TO A COMPUTER SYSTEM RESOURCE

(75) Inventors: Dirk Alan Banning, Harrisburgh, PA (US); Jeffrey A. Fromherz, Harrisburgh, PA (US); John Raymond McLaughlin, Mechanicsburg, PA (US); Paul L. Snyder, Mechanicsburg, PA (US)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 11/018,543

(22) Filed: Dec. 21, 2004

(65) Prior Publication Data

US 2006/0136638 A1    Jun. 22, 2006

(51) Int. Cl.
*G06F 15/173* (2006.01)
(52) U.S. Cl. .................................................... 709/226
(58) Field of Classification Search ............... 710/29, 710/39, 40, 41, 45; 709/223–226; 726/6, 726/7, 22
See application file for complete search history.

(56) References Cited

U.S. PATENT DOCUMENTS

| 5,381,413 | A   | 1/1995  | Tobagi et al.   |
|-----------|-----|---------|------------------|
| 5,899,991 | A   | 5/1999  | Karch            |
| 6,483,805 | B1  | 11/2002 | Davies et al.    |
| 6,637,027 | B1  | 10/2003 | Breslauer et al. |
| 6,639,975 | B1  | 10/2003 | O'Neal et al.    |
| 6,789,203 | B1* | 9/2004  | Belissent ...................... 726/22 |
| 6,961,341 | B1* | 11/2005 | Krishnan ...................... 370/412 |
| 7,047,303 | B2* | 5/2006  | Lingafelt et al. ........... 709/229 |
| 2002/0099825 | A1 | 7/2002 | Fertell et al.   |
| 2003/0023798 | A1* | 1/2003 | Appleby et al. ............ 710/240 |
| 2004/0117540 | A1* | 6/2004 | Hahn et al. ................. 711/100 |

OTHER PUBLICATIONS

DOS: Fighting Fire with Fire, Walfish et al., Nov. 2005.*
Low-Rate TCP-Targeted Denial of Service Attacks. Kuzmanovic et al., 2003.*
Chakrabarti, K., et al., "Efficient Concurrency Control in Multidimensional Access Methods," ACM SIGMOD International Conference on Management of Data, (Jun. 1999) (Abstract Only).

(Continued)

*Primary Examiner*—Khanh Dang
(74) *Attorney, Agent, or Firm*—William E. Schiesser; Kevin P. Radigan, Esq.; Heslin Rothenberg Farley & Mesiti, P.C.

(57) ABSTRACT

A facility for monitoring and controlling access of at least one entity to a computer system resource is provided employing at least one resource utilization threshold metric. The at least one resource utilization threshold metric is a workload characteristic of the computer system resource. Access of the at least one entity to the computer system resource is controlled in response to the at least one resource utilization threshold metric being met. The access control is automatic and may include at least one of assigning a lower priority to the entity in a computer resource scheduling algorithm, or waiting a predetermined period of time before the computer system resource provides a response to the at least one entity.

24 Claims, 3 Drawing Sheets

OTHER PUBLICATIONS

Argues, D., et al., "Comparison of Algorithms Controlling Concurrent Access to a Database: A Combinatorial Approach," Theoretical Computer Science, vol. 58, Nos. 1-3 (Jun. 1998), pp. 3-16.

Beard, C., et al., "Prioritized Resource Allocation for Stressed Networks," IEEE/ACM Transations on Networking, vol. 9, No. 5 (Oct. 2001), pp. 618-633.

* cited by examiner

METHOD, SYSTEM AND PROGRAM PRODUCT FOR MONITORING AND CONTROLLING ACCESS TO A COMPUTER SYSTEM RESOURCE

TECHNICAL FIELD OF THE INVENTION

The present invention relates in general to processing within a computing environment, and more particularly, to the monitoring and controlling of access of the at least one entity to a computer system resource within a computing environment based in part on realtime workload metrics.

BACKGROUND OF THE INVENTION

Computing environments are capable of processing various workloads for one or more entities. By way of example, a workload may comprise transactions processed by various systems, such as the Customer Information Control System (CICS) and DataBase2 (DB2) system, offered by International Business Machines Corporation, Armonk, N.Y.

Within a computing environment, certain non-malicious activity can have a similar effect on the system as a denial of service attack. For example, authorized users/entities can employ automated data mining processes that could stress a computing environment's infrastructure, thus degrading performance of an entire website or application suite served by that system infrastructure.

To illustrate a real world example, within a CICS environment, authorized users commonly employ automated "scripts," consisting of screen-scrapers and scripting languages. Each of these "automated" users can easily produce the same transaction load on a computer system resource as several hundred human users. If an interactive environment is sized, for example, to accommodate 5,000 current active human users, it can be seen that a small handful of automated users/scripts can significantly impact the environment's infrastructure.

Possible solutions to the problem could include adding capacity to address projected automated user loads, or simply suspending the offending user's access. The downside of adding capacity is that it is expensive, and difficult or impossible to predict what the automated user load might be for a given environment. The drawbacks of suspending a user's access are that it can cause annoyance to valid paying commercial customers, is difficult to administer, has administrative overhead (e.g., the suspended user can be expected to call the support center to negotiate a corrective action), and lacks timeliness, i.e., system degradation may already have occurred and is reactive rather than proactive.

Thus, a need exists in the art for an enhanced technique for controlling access to a computer system resource by valid entities, particularly in the case where the valid entity employs an automated script/process to, for example, perform data mining using the computer system resource.

SUMMARY OF THE INVENTION

The shortcomings of the prior art are overcome and additional advantages are provided through a method for controlling access to a computer system resource. The method includes: monitoring access of at least one entity to the computer system resource; defining at least one resource utilization threshold metric, wherein the at least one resource utilization threshold metric is a workload characteristic of the computer system resource; and controlling access of the at least one entity to the computer system resource in response to the at least one resource utilization threshold metric being met.

In enhanced aspects, the controlling is terminated in response to the at least one resource utilization threshold metric not being met. The controlling can include, for example, waiting a predetermined period of time before the computer system resource provides a response to the at least one entity, or assigning a lower priority to the at least one entity in a computer resource scheduling algorithm. The at least one resource utilization threshold metric may comprise at least one of: computer system resource requests per time period; concurrent computer system resource sessions; percent of incoming requests to the computer system resource; and percent of computer system resource load.

Systems and computer program products corresponding to the above-summarized methods are also described and claimed herein.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
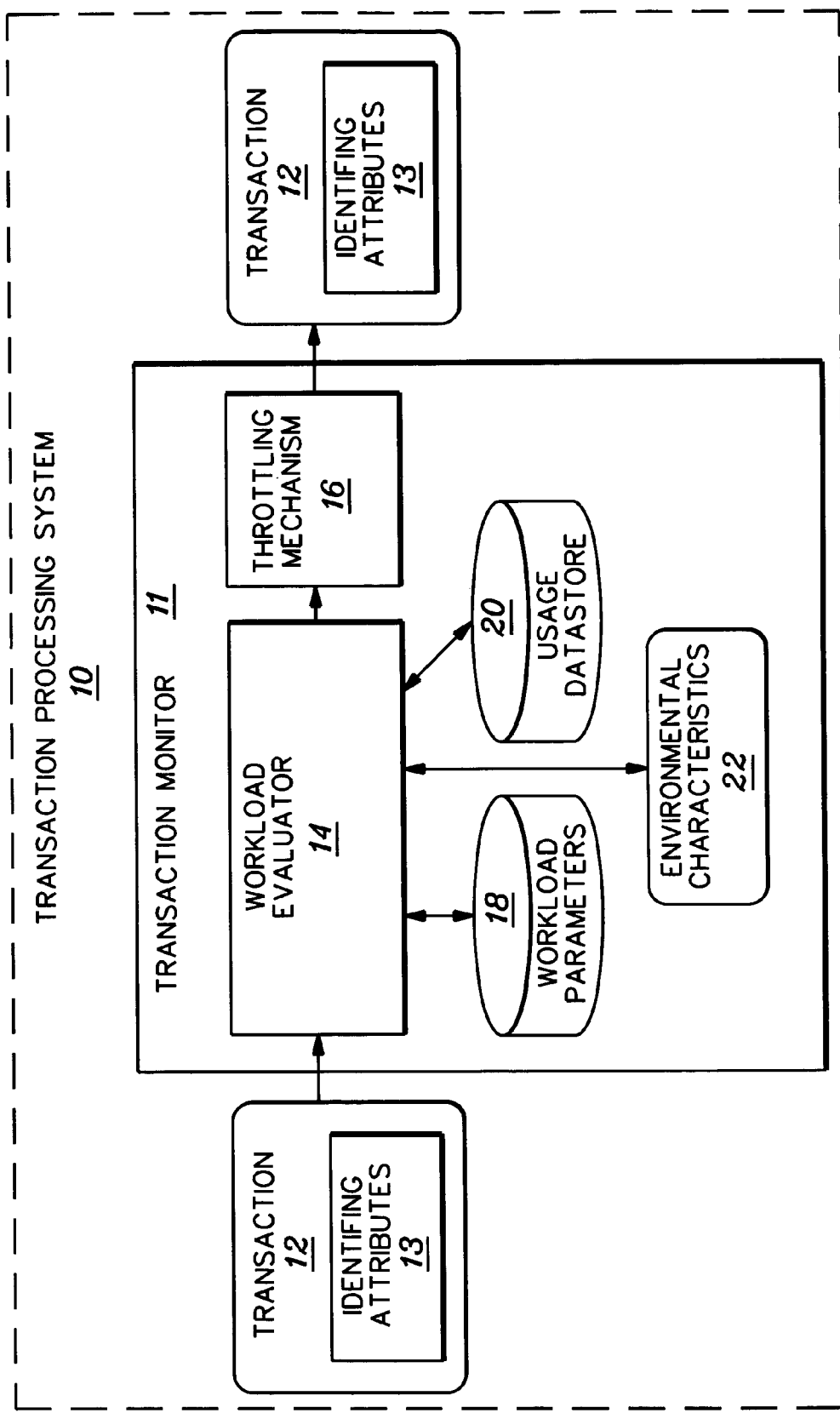
FIG. 1 depicts one embodiment of a transaction processing system incorporating a transaction monitor implementing a monitor and control facility, in accordance with an aspect of the present invention.

Presented herein is a facility for monitoring and controlling access of at least one entity to a computer system resource. At least one resource utilization threshold metric comprising a realtime workload characteristic of the computer system resource is defined, and when met, the facility selectively controls access to the computer system resource.

For example, when a quantity of access from a given entity exceeds a predefined threshold, then a facility (in accordance with an aspect of the present invention) serving a transactional environment (e.g., CICS, WebSphere, etc.) could begin to throttle access by that entity to the computer system resource. If, or when, the entity's utilization reduces to within nominal boundaries, service can be restored to normal levels for that entity. In one embodiment, the control facility could become active or inactive under varying realtime system load conditions. For example, a user's access may not be constrained unless the system is nearing or exceeding some defined stress level. In another embodiment, varying degrees of action against a given entity may be performed based on duration of the undesirable activity, severity of the activity, or any combination thereof.

Examples of "entities" include a user or group of users based on an IP address; a user or group of users based on a user id; a system to system connection, such as a B2B interface, etc. Examples of "predefined threshold or resource utilization threshold metric" can include: a defined number of transactions within a defined time interval; a defined number of concurrent sessions; a given entity is accounting for a defined percentage of all incoming requests (i.e., too many requested transactions); a given entity is accounting for a defined percentage of the total system load (e.g., the type of transactions requested are too resource intensive), etc. Further, combinations of resource utilization threshold metrics may be employed.

An example of a "throttling" action can include dynamically extending the response time to an entity, such as by adding several hundred milliseconds to the entity's response time. Examples of "system load conditions" might include: the system server or some other supporting server in a server complex is currently defined percentage "busy"; or the system server or some other supporting server in a server complex currently has a defined percentage of free storage.

Advantages of the facility disclosed herein are many, and include:
(1) The user/entity will not be "suspended"
  (a) The facility presents less of a customer satisfaction issue because the user retains full system access.
  (b) No potential contract issue; in many environments suspension is not an option.
(2) No need to "scale up" the computer system resource
  (a) Increased infrastructure costs avoided.
  (b) Usage "peaks" are substantially flattened.
(3) Highly configurable
  (a) Metrics will be, in certain embodiments of the invention, quite customizable.
(4) Low administrative overhead
  (a) Customer Service will not receive the typical "what is up with my ID" calls.
  (b) Invention will be largely autonomous after initial setup.
(5) Timeliness
  (a) Proactive environment for controlling anomalous sessions is established.
(6) Dynamic degree of response
  (a) In certain embodiments of the invention, one could take varying degrees of action depending upon the severity or duration of the undesirable activity.
(7) Adds a degree of toleration for true denial-of-service attacks
  (a) Any denial-of-service attack using repeated requests to the transaction server could be automatically detected and throttled, thus limiting the severity of the attack.

One embodiment of a computing environment incorporating and using one or more aspects of the present invention is depicted in FIG. 1. As one example, this computing environment comprises a transaction processing system 10 which includes a transaction monitor 11 for controlling the flow of transactions 12. Those skilled in the art will understand that the term "transaction" refers generically to any type of communication between two or more computing entities, and it is not limited to a particular programming construct. Transaction monitor 11 (which, for example, may be implemented as part of Websphere or an application server) determines if a given transaction should be affected by a throttling mechanism 16, in accordance with an aspect of the present invention. Transaction monitor 11, and more particularly, workload evaluator 14, analyzes identifying attributes 13 of a current transaction 12 in view of configurable workload parameters 18, current environmental characteristics 22, and a usage datastore 20. These evaluations determine whether the throttling mechanism 16 should be triggered for the current transaction. For example, workload evaluator 14 evaluates workload parameters 18 against identifying attributes 13 of a transaction 12, then analyzes usage datastore 20 to determine whether transaction 12, and/or the processing environment generally, has met a resource utilization threshold metric defined within workload parameters 18 that would signal the need to invoke throttling mechanism 16 for the transaction.

By way of further example, workload evaluator 14 can analyze environmental characteristics 22 to control operation of the transaction monitor 11. Environmental characteristics 22 are generally current workload information characteristics, i.e., current load upon the platform, e.g., processor utilization exceeding 80%.

Identifying attributes 13 of a transaction 12 may include information such as the source of the transaction 12, user identification, or the type of transaction or some other such indicative identifier as to the source or nature of the function to be performed as part of the given transaction 12.

Workload parameters 18 are used to configure and control the transaction monitor 11, and may include information such as thresholds for selectively triggering throttling mechanism 16 for transactions meeting a given subset of identifying attributes 13, as well as certain general activation limits.

The workload evaluator 14 maintains and updates the usage datastore 20, which stores usage details pertinent to the triggering of the throttling mechanism 16. Usage datastore 20 generally comprises some level of detail regarding the historical transactional load upon the system accessible by source; e.g., number of transactions per second coming from a given internet subnet or a given user id.

When triggered, throttling mechanism 16 may delay a given transaction 12 for an amount of time determined by logic within the workload evaluator 14, or by workload parameters 18, thereby constraining transaction 12 and having the effect of constraining overall throughput from the source of transaction 12.

Figure 2:
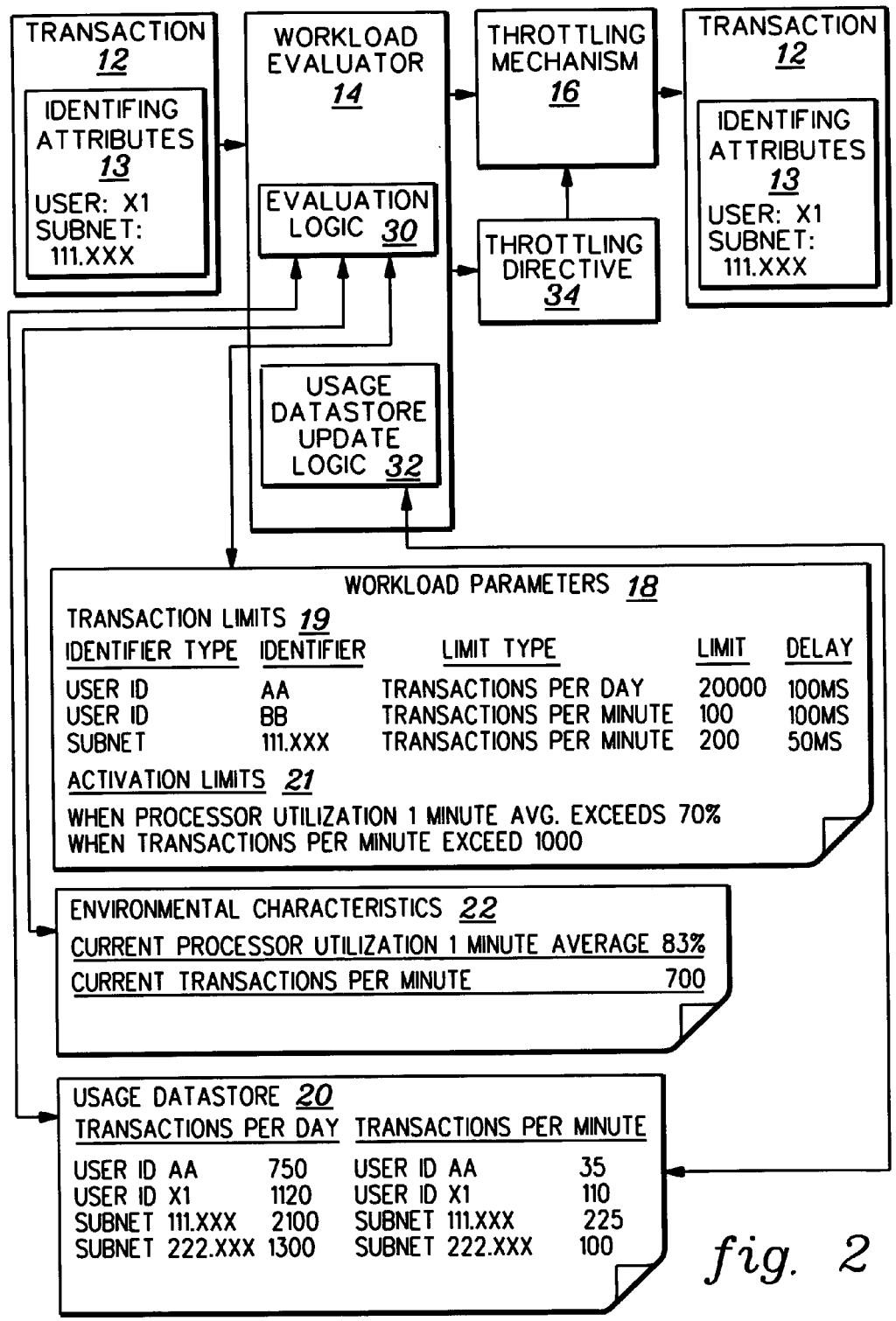
FIG. 2 depicts a more detailed example of the transaction monitor of the computing environment of FIG. 1, in accordance with an aspect of the present invention.

FIG. 2 depicts a more specific example of a monitor and control facility in accordance with an aspect of the present invention. In this example, workload evaluator 14 includes evaluation logic 30 and usage datastore update logic 32. Workload evaluator 14 receives a transaction 12 and evaluation logic 30 determines what identifying attributes 13 are known about transaction 12. In this case, the known identifying attributes 13 of transaction 12 are the user id X1, and the subnet 111.XXX of the data object.

In one example, evaluation logic 30 may initially compare environment activation limits 21 within workload parameters 18 against current environmental characteristics 22 to determine if the throttling facility should be active. In this example, it is determined that the "current processor utilization one minute average" of 83% meets the activation limit of "when processor utilization one minute average exceeds 70%", thus signaling that the control facility is active. Should the control facility find that no current environmental characteristic 22 meets or exceeds any activation limit 21, then the threshold metric is not met and the transaction would continue through the control facility without further action. Alternatively, environment activation limits and interrogation of current environmental characteristics 22 could be completely absent from the control facility.

Evaluation logic 30 next searches workload parameters 18 for identifiers matching the identifying attributes 13 of the current transaction 12. These identifying attributes 13 are held in a transaction limits 19 data structure which identifies usage limits or metrics for particular entities accessing the computer system resource. In this example, there is a matching transaction limit 19 since identifying attribute 13 subnet 111.XXX of transaction 12 matches a row within transaction limits 19. Included for each transaction limit 19 is a set of limit criteria, e.g., limit type, limit amount, etc., along with the desired delay for use by the throttling mechanism 16 should it be triggered by subsequent logic. For example, transaction limits 19 may dictate that a give transaction be delayed by some number of milliseconds. Alternatively, a plurality of limit 19 rows could be returned, in which case the subsequent logic could be performed for each row.

After receiving the results from transaction limits 19, evaluation logic 30 then searches usage datastore 20 for the given limit type and identifying attribute 13 from transaction limit 19. In this example, evaluation logic 30 finds a row within usage datastore 20 for subnet 111.XXX under the matching criteria "transactions per minute." Evaluation logic 30 compares the returned transaction limit 19, having a value of "200", against the returned usage datastore 20 row, which has a value of "225". Determination is thus made that the transaction should be acted on by the throttling mechanism 16 of the control facility. The delay value from the transaction limit 19 row of "50 ms" is then loaded into a throttling directive 34. Alternatively, a plurality of matching rows could be returned from usage datastore 20, with the appropriate action taken based upon the preferences of the implementer.

As a transaction proceeds through the throttling mechanism 16, the throttling directive 34 is interrogated to determined what delay action, if any, is to be performed upon the transaction 12. In this example, throttling mechanism 16 determines that throttling directive 34 contains a value of "50 ms" thereby instructing throttling mechanism 16 to delay progress of the transaction 12 by 50 milliseconds. After the desired delay time is met, transaction 12 continues through the transaction processing system 10.

As a further example, embodiments of transaction monitor 11 could be implemented at any point in the progress of a transaction through a transaction processing system. Further, the transaction monitoring facility could be applied to provide preferential treatment to a series of transactions by applying a default delay to all transactions, while excluding a group of transactions defined by the workload parameters 18.

Figure 3:
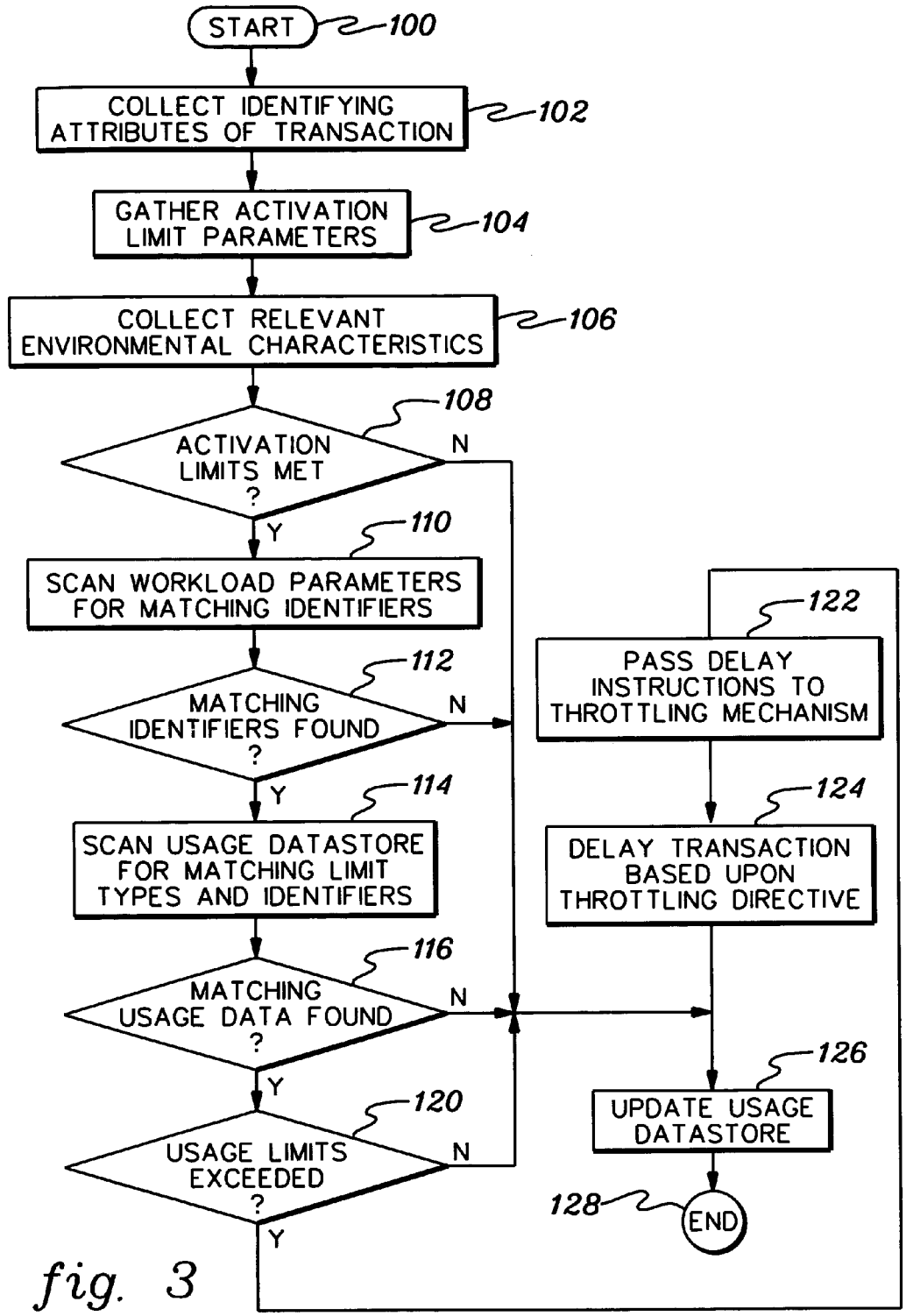
FIG. 3 is a flowchart of one embodiment of a technique for monitoring and controlling access to a computer system resource, in accordance with an aspect of the present invention.

By way of further example, FIG. 3 depicts a flowchart of one example of monitor and control facility logic in accordance with an aspect of the present invention. In this example, processing begins 100 with collecting identifying attributes of a transaction 102 and gathering of environmental activation limit parameters 104 from a data structure, e.g., from the workload parameter structure 18 in FIGS. 1 & 2. The control logic next collects relevant current environmental characteristics 106, which can comprise, for example, realtime computing environment characteristics that can be readily ascertained in the art. For instance, capabilities exists to indicate a total amount of resources consumed by CICS for workloads processed by CICS, or a total amount of resources consumed by DB2 for activity performed by DB2.

Logic then determines whether one or more of the environmental activation limits have been met 108. If no activation limit is met, then processing simply updates the usage datastore (e.g., datastore 20 in FIGS. 1 & 2), which completes processing of the transaction 128 by the monitor and control facility.

If one or more environmental activation limits are met, then the control logic scans the workload parameters data structure for matching identifiers 110. If no matching identifier for the transaction is found 112, then the usage datastore is updated 126 and processing by the monitor and control facility of the transaction ends 128.

If a matching identifier is found, then the logic scans the usage datastore for matching limit types and identifiers 114. If no match is found 116, then the usage datastore is updated 126 and processing of the transaction through the control facility ends 128. If matching usage data is found in the usage datastore, then the control logic determines whether the usage limits have been exceeded 120. Again, if no, then the usage datastore is updated 126 and processing of the transaction ends 128. If a usage limit is exceeded, then the control logic passes a delay instruction to the throttling mechanism 122 and the transaction is delayed based upon the defined throttling directive 124. Thereafter, the usage datastore is updated 126, completing processing of the transaction 128 by the monitor and control facility.

Those skilled in the art will note from the above discussion, that a facility is provided herein for monitoring and controlling when, for example, an automated user is excessively accessing a computer system resource within a computing environment by detecting this activity and constraining that user's access. In one example, "constraining" translates into limiting the user's ability to put excessive load on the computer system resource. This can be accomplished by artificially slowing down responses to that user's requests, such as by adding several hundred milliseconds of wait time before sending transactions result through for processing. Throughput would thus be reduced, minimizing stress to the overall computing environment caused by the single automated entity. When the activity of the entity moves back into normal ranges, the constraint imposed on that entity can be automatically terminated. Again, many variations to the above examples and environments may be provided, and are considered within the scope of the present invention.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has embodied therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for controlling access to a computer system resource, the method comprising:
    defining at least one environmental activation threshold metric, wherein the at least one environmental activation threshold metric is a workload characteristic of the computer system resource;
    monitoring access to the computer system resource and determining whether usage of the computer system resource meets the at least one environmental activation threshold metric, and if so, then for a current transaction requiring access to the computer system resource:
        collecting at least one identifying attribute of the transaction; and
        employing the at least one identifying attribute in determining whether the transaction is for at least one entity having a predefined usage limit, and if so, throttling access of the at least one entity to the computer system resource when the predefined usage limit for the at least one entity is met, otherwise allowing the current transaction to proceed unthrottled, wherein the at least one entity is less than all entities accessing the computer system resource.

2. The method of claim 1, wherein the throttling comprises delaying processing of the transaction based upon a throttling directive.

3. The method of claim 2, wherein the throttling directive comprises at least one of:
    waiting a predetermined period of time before the computer system resource provides a response to the at least one entity; and
    assigning a lower priority to the at least one entity in a computer resource scheduling algorithm.

4. The method of claim 1, wherein the at least one entity comprises a distinct connection to the computer system resource.

5. The method of claim 4, wherein the at least one entity comprises at least one of a network address or subset of network addresses, a user, another computer system resource, a server, a communications entity, and a storage entity.

6. The method of claim 1, wherein the at least one environmental activation threshold metric comprises at least one of:
    computer system resource requests per time period;
    computer system resource consumption per time period;
    concurrent computer system resource sessions;
    percent of incoming requests to the computer system resource by the at least one entity; and
    percent of computer system resource load.

7. The method of claim 1, wherein said determining whether the at least one environmental activation threshold metric has been met, comprises collecting at least one of current usage information for the computer system resource and a current utilization per defined time interval for the computer system resource.

8. The method of claim 7, wherein the throttling comprises delaying access by the at least one entity to the computer system resource for a predefined time interval.

9. A system for controlling access to a computer system resource, the system comprising:
    means for defining at least one environmental activation threshold metric, wherein the at least one environmental activation threshold metric is a workload characteristic of the computer system resource;
    means for monitoring access to the computer system resource and means for determining whether usage of the computer system resource meets the at least one environmental activation threshold metric, and if so, then for a current transaction requiring access to the computer system resource:
        means for collecting at least one identifying attribute of the transaction; and
        means for employing the at least one identifying attribute in determining whether the transaction is for at least one entity having a predefined usage limit, and if so, for throttling access of the at least one entity to the computer system resource when the predefined usage limit for the at least one entity is met, otherwise for allowing the current transaction to proceed unthrottled, wherein the at least one entity is less than all entities accessing the computer system resource.

10. The system of claim 9, wherein the means for throttling comprises means for delaying processing of the transaction based upon a throttling directive.

11. The system of claim 10, wherein the means for throttling directive comprises at least one of
    means for waiting a predetermined period of time before the computer system resource provides a response to the at least one entity; and
    means for assigning a lower priority to the at least one entity in a computer resource scheduling algorithm.

12. The system of claim 9, wherein the at least one entity comprises a distinct connection to the computer system resource.

13. The system of claim 12, wherein the at least one entity comprises at least one of a network address or subset of network addresses, a user, another computer system resource, a server, a communications entity, and a storage entity.

14. The system of claim 9, wherein the at least one environmental activation threshold metric comprises at least one of:
    computer system resource requests per time period;
    computer system resource consumption per time period;
    concurrent computer system resource sessions;
    percent of incoming requests to the computer system resource by the at least one entity; and
    percent of computer system resource load.

15. The system of claim 9, wherein said means for determining whether the at least one environmental activation threshold metric has been met, comprises means for collecting at least one of current usage information for the computer system resource and a current utilization per defined time interval for the computer system resource.

16. The system of claim 15, wherein the means for throttling comprises means for delaying access by the at least one entity to the computer system resource for a predefined time interval.

17. At least one program storage device readable by a machine tangibly embodying at least one program of instructions executable by the machine to perform a method of controlling access to a computer system resource, the method comprising:

defining at least one environmental activation threshold metric, wherein the at least one environmental activation threshold metric is a workload characteristic of the computer system resource;

monitoring access to the computer system resource and determining whether usage of the computer system resource meets the at least one environmental activation threshold metric, and if so, then for a current transaction requiring access to the computer system resource:

collecting at least one identifying attribute of the transaction; and employing the at least one identifying attribute in determining whether the transaction is for at least one entity having a predefined usage limit, and if so, throttling access of the at least one entity to the computer system resource when the predefined usage limit for the at least one entity is met, otherwise allowing the current transaction to proceed unthrottled, wherein the at least one entity is less than all entities accessing the computer system resource.

18. The at least one program storage device of claim 17, wherein the throttling comprises delaying processing of the transaction based upon a throttling directive.

19. The at least one program storage device of claim 18, wherein the throttling directive comprises at least one of:

waiting a predetermined period of time before the computer system resource provides a response to the at least one entity; and assigning a lower priority to the at least one entity in a computer resource scheduling algorithm.

20. The at least one program storage device of claim 17, wherein the at least one entity comprises a distinct connection to the computer system resource.

21. The at least one program storage device of claim 20, wherein the at least one entity comprises at least one of a network address or subset of network addresses, a user, another computer system resource, a sever, a communications entity, and a storage entity.

22. The at least one program storage device of claim 17, wherein the at least one environmental activation threshold metric comprises at least one of:

computer system resource requests per time period;

computer system resource consumption per time period;

concurrent computer system resource sessions;

percent of incoming requests to the computer system resource by the at least one entity; and percent of computer system resource load.

23. The at least one program storage device of claim 17, wherein said determining whether the at least one environmental activation threshold metric has been met, comprises collecting at least one of current usage information for the computer system resource and a current utilization per defined time interval for the computer system resource.

24. The at least one program storage device of claim 23, wherein the throttling comprises delaying access by the at least one entity to the computer system resource for a predefined time interval.

\* \* \* \* \*